(12) United States Patent
Estep

(10) Patent No.: US 7,477,207 B2
(45) Date of Patent: Jan. 13, 2009

(54) DIVING MASK WITH EMBEDDED COMPUTER SYSTEM

(75) Inventor: Randall S. Estep, Harrisonburg, VA (US)

(73) Assignee: Trilithic, Inc, Indianapolis, IN (US)

( * ) Notice: Subject to any disclaimer, the term of this patent is extended or adjusted under 35 U.S.C. 154(b) by 1002 days.

(21) Appl. No.: 09/914,969

(22) PCT Filed: Jun. 22, 2001

(86) PCT No.: PCT/US01/20064

§ 371 (c)(1),
(2), (4) Date: Sep. 6, 2001

(87) PCT Pub. No.: WO02/00299

PCT Pub. Date: Jan. 3, 2002

(65) Prior Publication Data

US 2003/0115010 A1    Jun. 19, 2003

Related U.S. Application Data

(60) Provisional application No. 60/213,824, filed on Jun. 23, 2000.

(51) Int. Cl.
*G09G 5/00* (2006.01)
(52) U.S. Cl. .............................. 345/8; 345/7
(58) Field of Classification Search .................. 351/41, 351/43; 345/7, 8; 359/13, 630, 629
See application file for complete search history.

(56) References Cited

U.S. PATENT DOCUMENTS

| | | | | |
|---|---|---|---|---|
| 4,471,174 A | * | 9/1984 | Nava | 379/430 |
| 4,718,415 A | * | 1/1988 | Bolnberger et al. | 128/201.19 |
| 5,033,818 A | | 7/1991 | Barr | 350/174 |
| 5,353,054 A | | 10/1994 | Geiger | 348/81 |
| 5,420,828 A | | 5/1995 | Geiger | 367/131 |
| 5,574,794 A | * | 11/1996 | Valley | 381/361 |
| 5,594,573 A | | 1/1997 | August | 349/13 |
| 5,598,297 A | | 1/1997 | Yamanaka et al. | |

(Continued)

OTHER PUBLICATIONS

PCT International Search Report for International Application No. PCT/US01/20064.

*Primary Examiner*—Ricardo L Osorio
(74) *Attorney, Agent, or Firm*—Husch Blackwell Welsh & Katz (57) ABSTRACT

An underwater diving mask for use by a diver in an underwater diving environment has a viewing portion defined by the diver's face and a lens, a visual display device proximate the viewing portion to provide visual images to the diver, a speaking chamber configured to sealing engage a portion of the diver's mouth to permit the diver to speak, and a sound transducer located proximal the speaking chamber. A computer system is disposed in a portion of the mask and is operatively coupled to the sound transducer and to the visual display device, where the computer system, the viewing portion and the speaking chamber are sealing isolated from the underwater diving environment. The computer system receives electrical signals produced by the sound transducer and is configured to recognize and identify the electrical signals as spoken words of the diver, such that the identified spoken words provide input to the computer to direct the computer system to provide visual images to the visual display in response thereto, to facilitate hands-free operation of the diver.

18 Claims, 9 Drawing Sheets

U.S. PATENT DOCUMENTS

| | | |
|---|---|---|
| 5,764,203 A | 6/1998 | Holmlund et al. ............... 345/8 |
| 5,844,824 A | 12/1998 | Newman et al. |
| 5,886,822 A | 3/1999 | Spitzer ....................... 359/630 |
| 5,899,204 A | 5/1999 | Cochran ................ 128/205.23 |
| 5,926,779 A | 7/1999 | Garofalo .................... 702/138 |
| 5,956,291 A | 9/1999 | Nehemiah et al. ........... 367/131 |
| 6,008,780 A | 12/1999 | Clarke et al. .................... 345/8 |
| 6,032,664 A | 3/2000 | Gray et al. ............. 128/201.27 |
| 6,039,446 A | 3/2000 | Lähteenmäki ................ 351/43 |
| 6,066,129 A * | 5/2000 | Larson ........................ 606/10 |
| 6,084,556 A | 7/2000 | Zwern |
| 6,360,182 B1 * | 3/2002 | Hales ........................ 702/139 |

* cited by examiner

DIVING MASK WITH EMBEDDED COMPUTER SYSTEM

CROSS-REFERENCE TO RELATED APPLICATIONS

This application claims priority from co-pending U.S. provisional application No. 60/213,824, filed Jun. 23, 2000, which is commonly owned and incorporated by reference herein.

BACKGROUND OF THE INVENTION

In this written description, the use of the disjunctive is intended to include the conjunctive. The use of definite or indefinite articles is not intended to indicate cardinality. In particular, a reference to "the" object or thing or "an" objection or "a" thing is intended to also describe a plurality of such objects or things.

This invention generally relates to diving equipment and more particularly to a diving mask having an embedded computer system therein.

Some limited purpose underwater "dive" computers inform the diver as to the time remaining before he must surface. While a variety of specialized, non-computerized equipment exists for accomplishing tasks under water, such tasks including communications, lighting, photography, location and direction sensing, homing devices, etc., these devices, in general, have not evolved to the point of having limited purpose computers associated with them.

Although some efforts have been made to modify existing computer hardware for submersed use, such as the WETPC developed by the Marine Institute of Australia, many challenges remain in refining this technology. Adapting computers for use underwater is complicated by the peculiar packaging and ergonomic needs that are inherent in submersing the human body in water.

Foremost, a submersed human must be concerned with life support systems and maintaining spatial awareness. These primary requirements are supported by a variety of specialized devices that assist the submersed human in seeing, breathing, and achieving propulsion through water. To a large degree, the attention of the diver is directed to utilizing or monitoring the various apparatus he has selected to support that primary requirement.

Underwater support equipment, by its nature, is cumbersome and alien. Attaching yet another piece of equipment, such as a computer adapted from the more traditional hardware configurations, is just one more device that must be mounted, cabled, wired, and secured to the diver. This increases drag and provides another point for snagging or malfunction due to snagging. Such devices are typically mounted or strapped to the diver's arms, legs, torso, or mounted on the air tanks.

Modern conventional desktop personal computer systems are typically used in a dry, indoor area, and consist of a relatively large electronics cabinet, a separate CRT or LCD monitor, a keyboard and mouse. The desktop configuration requires that a user come to the computer because the system is designed as a stationary device. Laptop computers afford the user a certain degree of mobility, but still have restrictions of use due to size, weight, environmental characteristics, and the need for the user to be somewhat stationary while using the computer.

Moreover, most of the current computer hardware technology and applications are directed toward using the computer equipment on land, and do not address the needs of submersed computing. Because 80% of the Earth's surface is covered by water, a skewed ratio of geographical space to computer accessible space exists. The applications for submersed computing and/or underwater data collection are numerous. Demand exists for underwater computer applications in the fields of underwater geography, geology, deep-sea oil exploration, marine biology, construction, excavation, demolition, ship building and maintenance, surveillance, communication, education, and treasure hunting, as well as military uses such as mine clearing and surveillance to name only a few.

Conventionally adapted configurations of computers for body-worn computers require that a head mounted display is placed in front of the diver's eye and tethered to a computer, pressure enclosure, which would typically be mounted on the air tank or elsewhere on the divers body. This would be further tethered to a handheld device (pointing device) used for navigation on the computer screen. One known handheld device is the controller for the Chordic Graphical Interface System developed by the Marine Institute of Australia, which in many ways restricts the range of actual computer applications that can be used while underwater. This is because of its specialized nature and limitations of data input. Additionally, use of hand-held data input devices require the sacrifice of the full use of at least one hand, which may not be practical during a dive because the use of that hand may be required for other activities.

Therefore, the present invention describes a system for underwater computing that combines the specialized equipment needed with standard items of diving equipment, provides enhanced diver streamlining, and allows hands-free user input and control of equipment necessary to a diver.

BRIEF SUMMARY OF THE INVENTION

The present invention relates to diving equipment and more particularly to a diving mask having an embedded computer system therein.

One aspect of this invention is an underwater diving mask for use by a diver in an underwater diving environment. The diving mask has a viewing portion defined by the diver's face and a lens, a visual display device proximate the viewing portion to provide visual images to the diver, a speaking chamber configured to sealing engage a portion of the diver's mouth to permit the diver to speak, and a sound transducer located proximal the speaking chamber. A computer system is disposed in a portion of the mask and operatively coupled to the sound transducer and to the visual display device, where the computer system, the viewing portion and the speaking chamber are sealing isolated from the underwater diving environment. The computer system receives electrical signals produced by the sound transducer and is configured to recognize and identify the electrical signals as spoken words of the diver, such that the identified spoken words provide input to the computer to direct the computer system to provide visual images to the visual display in response thereto, to facilitate hands-free operation of the diver.

In one embodiment of the invention, the diving mask is operatively coupled to the display device such that no wiring or tether external to the diving mask is required.

In another embodiment of the invention, the display device is operatively coupled to the computer system by short length of cabling so that no external cabling extends from the diving mask in a region defined by the diver's head portion to a part of the diver located away from the diver's head.

In a further embodiment of the present invention, the sound transducer is selected from the group consisting of a microphone, crystal microphone, piezoelectric transducer, throat/larynx transducer and vibration transducer, the computer system is selected from the group consisting of a computer, microprocessor, RISC processor, single-chip computer, single-board computer, controller, micro-controller and discrete logic computer, and the display device is selected from the group consisting of a liquid crystal display, LED display, electro-fluorescence display, gas plasma display, prism-type optic display, prismatic projection system and cathode ray tube.

In another embodiment, the present invention further includes non-volatile storage operatively coupled to the computer system, the non-volatile storage is selected from the group consisting of a ROM, PROM, EPROM, flash memory, optical memory, static memory, bubble memory, memory sticks and hard disk memory.

Still another embodiment includes a speech recognition portion that is configured to receive and process the electrical signals from the sound transducer, and is configured to recognize and identify the electrical signals as the spoken words from the diver, and to provide input to the computer system corresponding to the spoken words.

Yet another embodiment further includes a speech recognition processor operatively coupled to the sound transducer to receive the electrical signals therefrom, and operatively coupled to the computer system, where the speech recognition processor is configured to recognize and identify the electrical signals as the spoken words from the diver and to provide input to the computer system corresponding to the spoken words.

Alternatively, the computer system provides a plurality of predetermined functions displayed on the display device, where the computer system performs at least one of the predetermined functions in response to the input representative of the spoken words of the diver.

In still another embodiment of the invention, the computer system provides one or more menus to the display device, where each menu contains one or more predetermined functions executable by the computer system.

In a still further embodiment, the plurality of menus include a hierarchical set of menus.

In yet another embodiment, the predetermined functions are selected from the group consisting of a menu, pull-down menus, digital camera control applications, life support applications, general purpose applications, gyroscopic/inertial sensor applications, transmitter and receiver applications and power management applications.

Another embodiment includes a gyroscopic/inertial sensor operatively coupled to the computer system.

An alternate embodiment further includes a receiver system operatively coupled to the computer system, which is configured to receive incoming data from the underwater diving environment, and a transmitter system operatively coupled to the computer system and configured to transmit data to the underwater diving environment, where the receiver system and transmitter system are located proximal the diving mask and are sealing isolated from the underwater diving environment.

In another embodiment, the data is selected from the group consisting of speech data, digital data, numerical data and graphical data.

Another aspect of the invention is an underwater diving mask for use by a diver in an underwater diving environment. Such a diving mask has a viewing portion defined by the diver's face and a lens, a display means for providing visual images to the diver, a speaking chamber configured to sealing engage a portion of the diver's mouth to permit the diver to speak, a sound transducer located proximal the speaking chamber, and a computer system disposed in a portion of the mask and operatively coupled to the sound transducer and to the display means. The computer system, the viewing portion and the speaking chamber are sealing isolated from the underwater diving environment. The diving mask has voice recognition means for recognizing and identifying spoken words of the diver, where the identified spoken words are provided to the computer system as input thereto to direct the computer system to provide visual images to the display means in response thereto, to facilitate hands-free operation of the diver.

Alternatively, the voice recognition means is operatively associated with the computer system and is configured to receive the electrical signals from the sound transducer, while the voice recognition means is configured to recognize and identify the electrical signals as the spoken words from the diver and to provide input to the computer system corresponding to the spoken words.

Alternatively, the voice recognition means further includes a voice recognition processor operatively coupled to the computer system and coupled to the sound transducer to receive the electrical signals therefrom, where the speech recognition processor is configured to recognize and identify the electrical signals as the spoken words from the diver and to provide input to the computer system corresponding to the spoken words.

Another still further aspect of the invention is a method of controlling a computer in an underwater diving environment to facilitate hands-free operation of the diver. Such a method includes the steps of:

providing the diver with a diving mask having a viewing portion defined by the diver's face and a lens, placing a visual display device proximate the viewing portion to provide visual images to the diver, incorporating a sound transducer within a speaking chamber, the speaking chamber configured to sealing engage a portion of the diver's mouth to permit the diver to speak, operatively coupling a computer system with the sound transducer and the visual display device, sealingly isolating the computer system, the viewing portion, and the speaking chamber from the underwater diving environment, speaking into a sound transducer located proximal the speaking chamber to produce electrical signals, receiving and processing the electrical signals by the computer system, the computer system recognizing and identifying the electrical signals as spoken words of the diver, the identified spoken words providing input to the computer, and directing the computer system to provide visual images to the visual display in response to the identified spoken words to facilitate hands-free operation of the diver.

Other features and advantages of the present invention will be apparent to those skilled in the art from the following detailed description, the accompanying drawings and the appended claims.

BRIEF DESCRIPTION OF THE DRAWINGS

The benefits and advantages of the present invention will become more readily apparent to those of ordinary skill in the relevant art after reviewing the following detailed description and accompany drawings.

DETAILED DESCRIPTION OF THE INVENTION

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be further understood that the title of this section of the specification, namely, "Detailed Description of the Invention" relates to a rule of the United States Patent and Trademark Office, and is not intended to, does not imply, nor should be inferred to limit the subject matter disclosed herein or the scope of the invention.

The invention is comprised of several sub-parts that serve a portion of the total functionality of the invention independently and contribute to system level functionality when combined with other parts of the invention.

Figure 1:
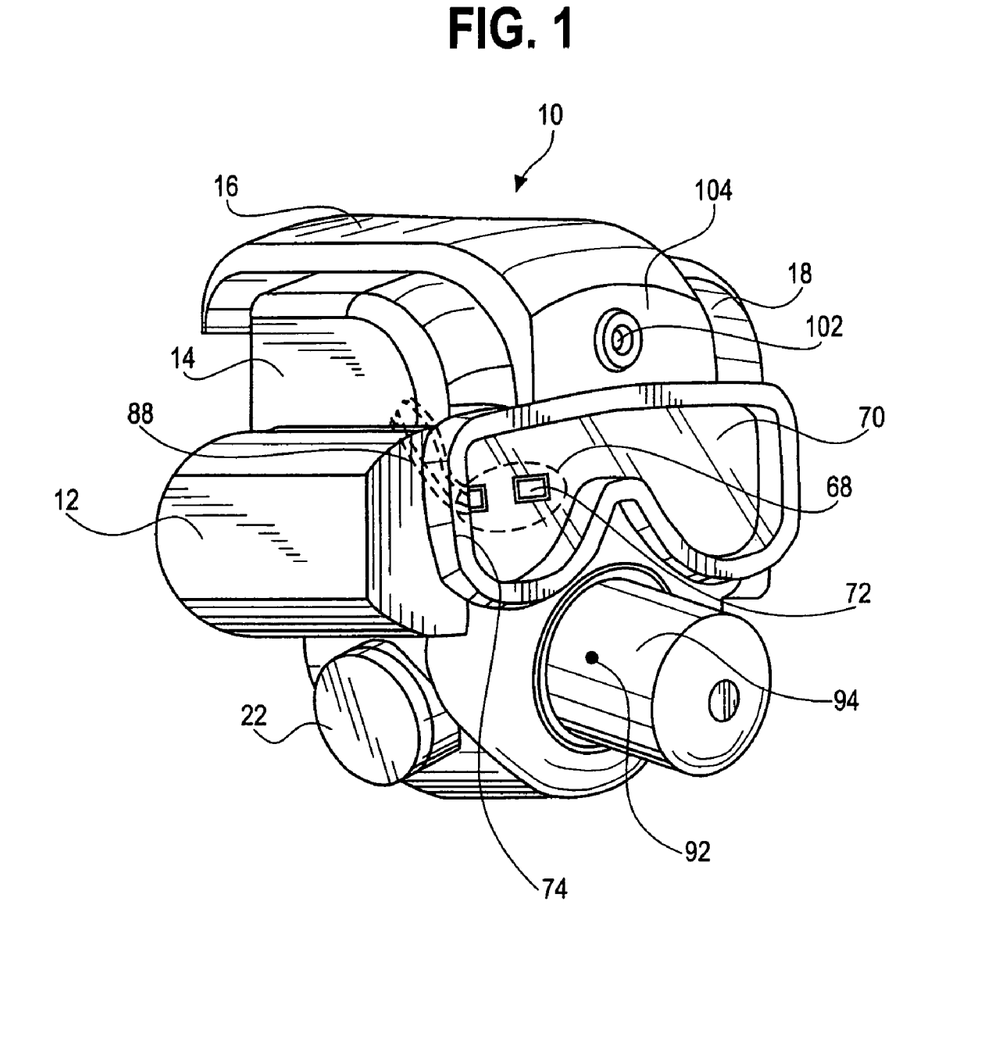
FIG. 1 is a perspective view of a face mask embodying the present invention.
Figure 2:
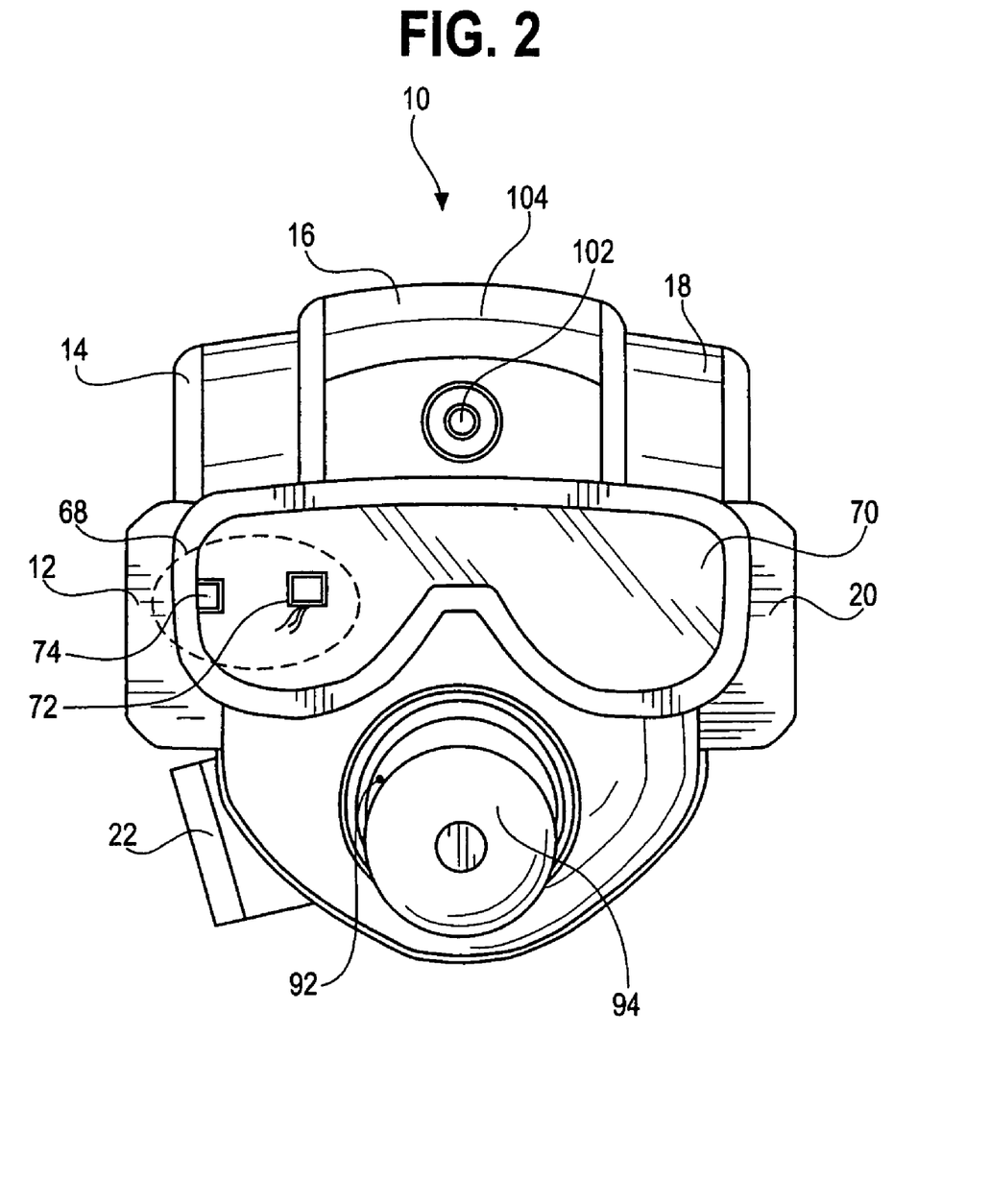
FIG. 2 is a front view of a face mask embodying the present invention.
Figure 3:
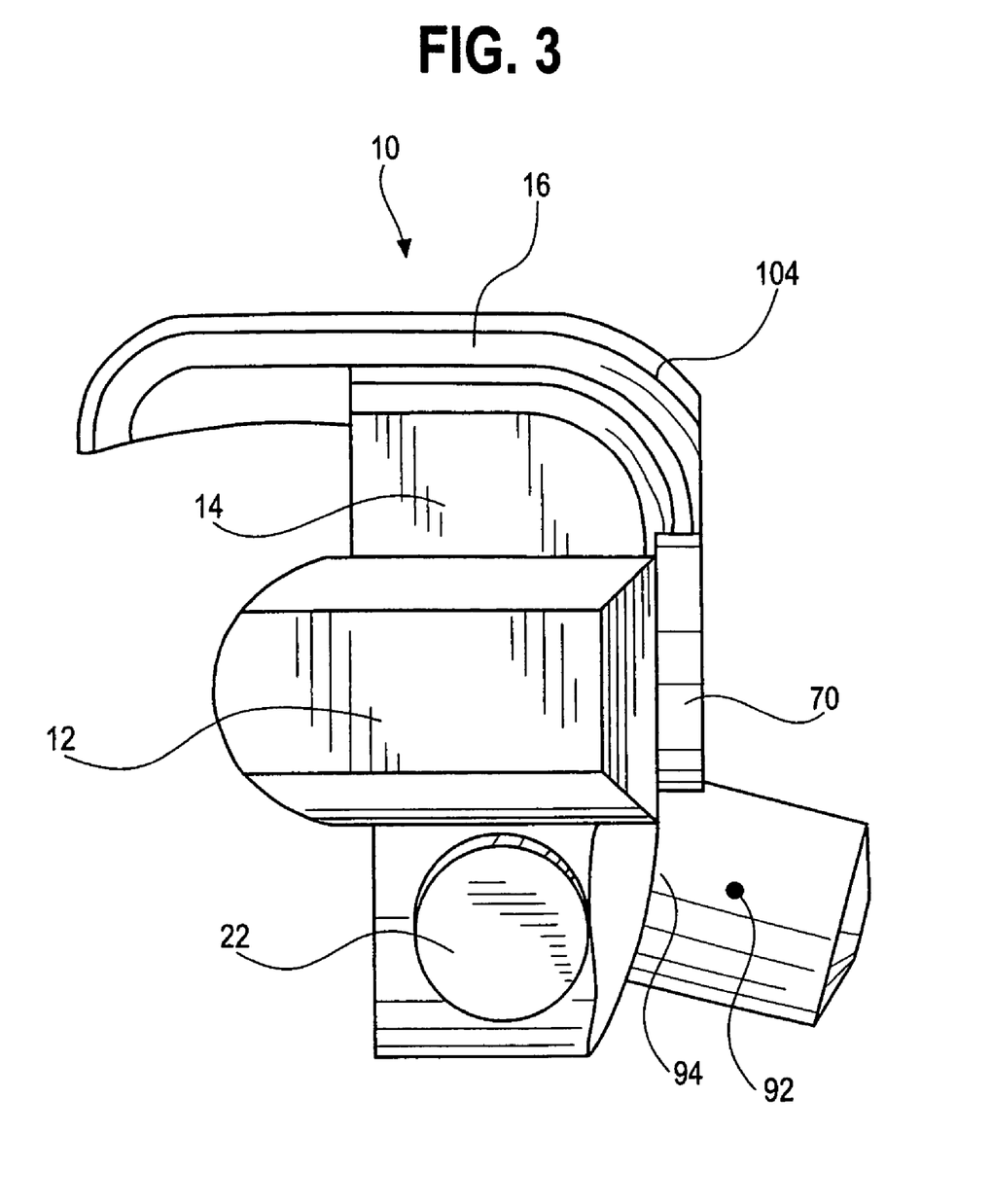
FIG. 3 is a side view of a face mask embodying the present invention.

A full face mask 10 embodying the present invention is shown in FIGS. 1-3. As will be appreciated by those of ordinary skill in the art, the present invention can also be readily implemented in band masks, full helmets, bubble-type helmets or any other past, present or future construction of a mask or helmet. All of the various embodiments described below can be implemented utilizing all configurations of standard diving masks, or specialized "full face" masks. For example, full face masks suitable for use include the Full Face Mask available from Ocean Reef USA of San Marcos, Calif., or the balanced regulator Model EXO-BR mask 300-036 or 300-036MS available from Diving Systems International Inc. of Santa Barbara, Calif. The present invention applies to helmets as well as masks.

Referring to FIGS. 1-3, and FIG. 1 in particular, the illustrated embodiment of the diving masks includes a lens and an oral-nasal portion. The manufacture and design of diving mask lenses is well known in the art and the present invention is not limited to a particular design of lens. The mask is configured so that the mask sealingly engages a diver's eye region to maintain a seal to prevent water from entering the mask. The mask is configured to provide the lens in front of the diver's eyes when the mask is worn. The area between the diver's face and the lens may be considered to be a viewing area because it is this portion through which the diver views the external environment. The external environment or underwater diving environment is any body of water.

The mask is configured such that a speaking chamber is present proximate the diver's mouth to receive sound signals. In one embodiment, the speaking chamber is an open oral-nasal portion configured to sealingly engaging an area about the nose and mouth of the diver. To facilitate speech, the oral-nasal portion defines a cavity around the mouth of the diver to permit speech. As will be appreciated by those of ordinary skill in the art, the oral-nasal portion is configured to be connected to an air supply, typically from a compressed air tank worn on the diver's back.

The mask is configured to engage the head of the diver. The mask preferably includes a chin strap or an "over the head" strap, or both. In addition to the "off-the-shelf" portions of a diving mask, the mask includes one or more waterproof compartments that contain and protect electronic equipment from water when the mask is submersed. The compartments can be integrally formed with the mask, or can be of modular construction such that the compartments can be attached or detached from the mask as desired. The compartments are waterproof enclosures or cavities sealed along the bridge or sides of the mask, as is known in the art.

The mask of the embodiment illustrated in FIGS. 1-3 may include a first compartment 12 proximate the right ear of the diver, a second compartment 14 proximate the upper right side of the diver's head, a third compartment 16 configured to lie over the diver's head, a fourth compartment 18 adjacent to the upper left side of the diver's head, a fifth compartment 20 proximate to the right ear of the diver, and a sixth compartment 22 located by the right cheek of the diver. However, the present invention is not limited to the above-described number of compartments, and may have fewer than or more than the number described or illustrated, depending upon the diver's needs and the specific underwater application in which the diver is engaged.

Referring now to FIGS. 1-4, the first compartment 12 may contain a peripheral device interface 24, a voice command (or speech recognition) system 26, a voice/data receiver 28, and an interface for a tactile diver input system 30. The second compartment 14 may have a display controller 32. The third compartment 16 may include a general purpose computer 34 (synonymous with "computer system" or "computer"), a data encoder/decoder 36, and a non-volatile memory system 38. The fourth compartment 18 may have a gyroscopic/inertial sensor 40, and the fifth compartment 20 may include a voice/data transmitter 42, a power source interface 44, and a life support monitoring system 46. The sixth compartment 22 may include an earphone system 48. As will be appreciated by those of ordinary skill, the number of compartments can vary, as can the location of particular sub-systems.

Referring to FIGS. 1-4, the diving mask 10 has a fully-functional and self-contained computer system 34 that is contained entirely within the confines of a commercially-available or modified diving mask or full face mask. In defining "contained entirely" or "embedded" it will be understood by those skilled in the art that the computer 34 is effectively incorporated in the mask 10, but may be part of a removable module, circuit board, or otherwise be insertable and removable for repair, replacement, configuration or other purposes. At least one watertight sealable compartment is provided to house the computer system 34. The computer system can be a general purpose computer 34, preferably located in the third compartment 16 of the mask 10. As will be appreciated by those of ordinary skill in the art, a general purpose computer system 34 can be constructed in a large number of ways and from a wide variety of available parts. The computer 34 may include a computer, microprocessor, RISC processor, single-chip computer, single-board computer, micro-controller or discrete logic computer (not shown). The computer 34 may have various specialized or general functions implemented as either hardware, software, or firmware. For example, the computer system 34 may contain a speech recognition portion, which may be implemented as hardware, software, or firmware, as described in greater detail hereinafter.

Figure 4:
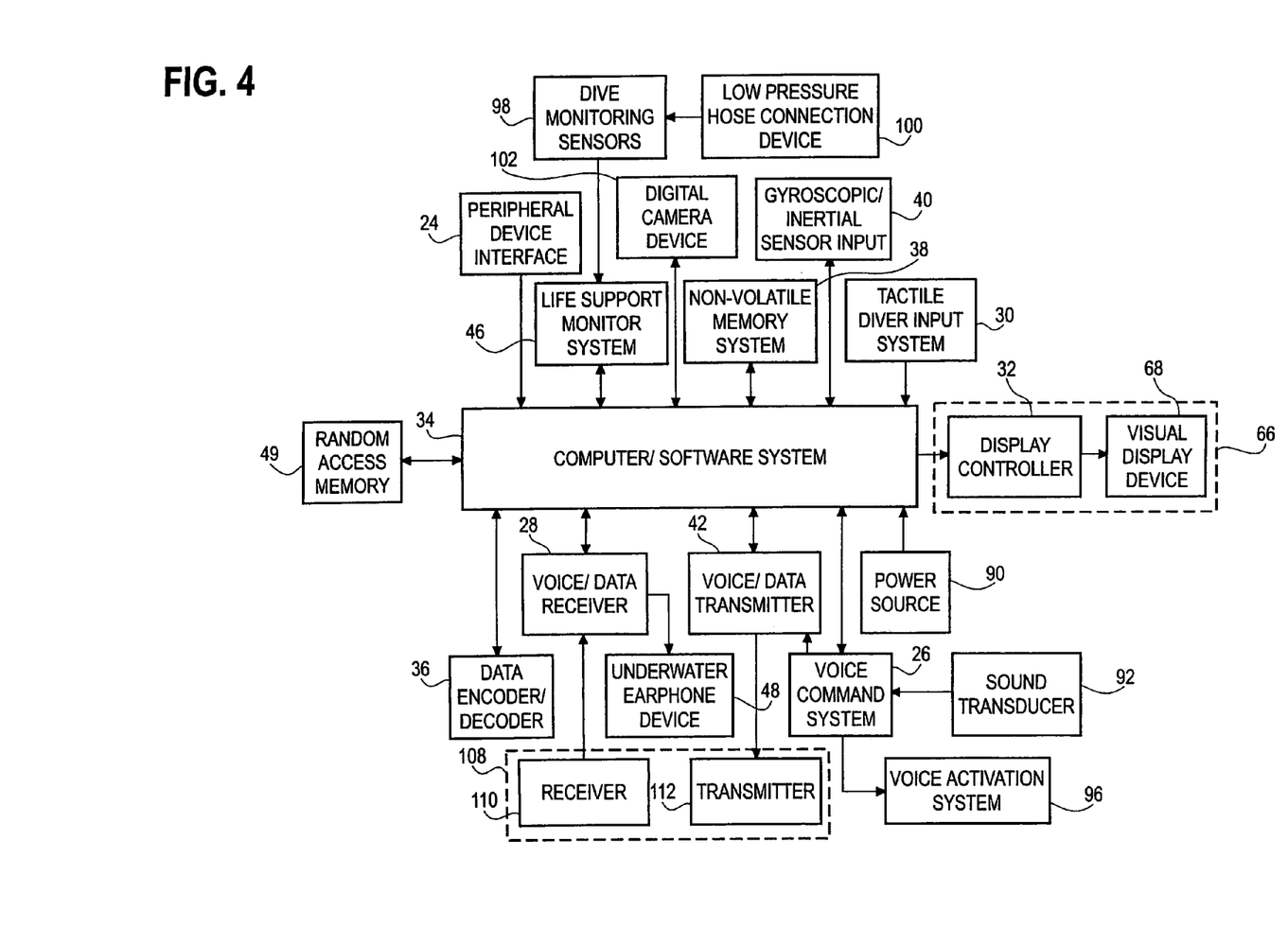
FIG. 4 is a block diagram.

In one preferable embodiment, the computer system 34 is built around a highly-integrated single chip, such as the ZFX86 PC-on-a-chip (Model SOC-MZP-Q-01) available or from ZF Micro Devices, Palo Alto, Calif. The ZFX86 as several advantages, including high reliability, low power consumption and low heat generation. By providing random-access memory 49 to run the various programs, and optional peripherals as desired, a fully-functional general purpose computer can be constructed. The ZFX86 PC-on-a-chip has an integrated SDRAM controller, thus SDRAM is preferably included as the main memory for use with the ZFX86. Additionally, ZFX86 is energy-efficient, as it draws less than 2 watts of power.

The computer system 34 may further include non-volatile memory 38. Suitable non-volatile memory devices include, for example, read-only storage, mass storage devices, electronically programmable storage, ROM memory, PROM memory, EPROM memory, EEPROM memory, flash memory, optical memory, static memory, bubble memory and hard disk memory. Some suitable commercially-available products include MICRODRIVE manufactured by IBM Corporation, DISKONCHIP single-disk flash chip, FFD fast flash disk manufactured by M-Systems of Newark, Calif., FlashDrive manufactured by Sandisk Corporation of Sunnyvale, Calif., and MEDIASTIK flash modules manufactured by Nexflash Technologies, Inc. of Santa Clara, Calif. Any suitable commercially available non-volatile storage device may be used, and may be installed as part of the computer system.

Appropriate mounting hardware can be provided to permit the volatile and non-volatile memory to be easily swapped, such as a docking port or socket. For example, a CF+ interface can be provided to permit the MICRODRIVE device to be easily removed and replaced. Those of ordinary skill will appreciate the variety of possible storage media and installation available. Accordingly, any suitable storage system and their equivalents are contemplated by the invention.

Figure 5:
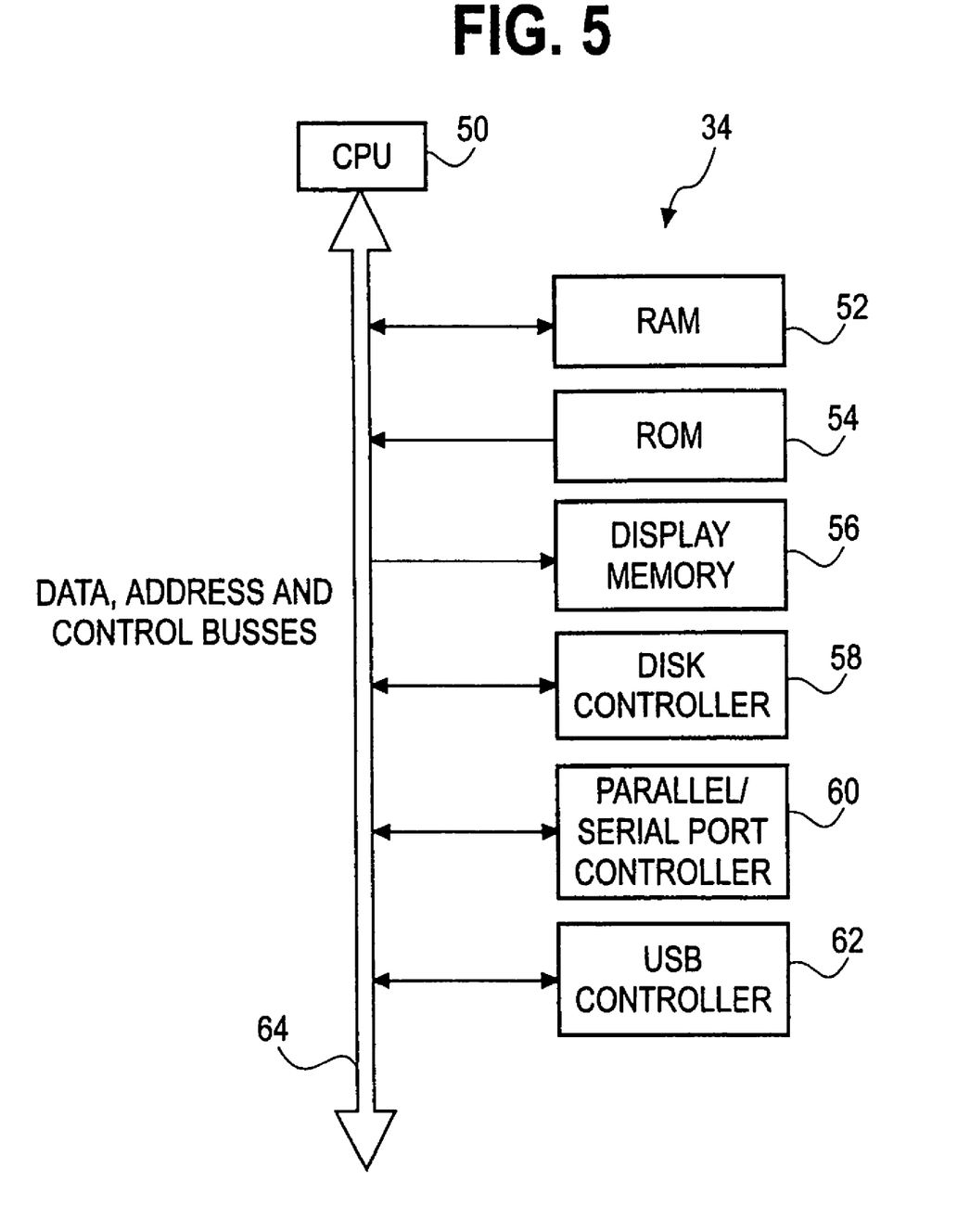
FIG. 5 is a block diagram of a computer system.

Referring to FIG. 5, in an alternate embodiment, the computer system 34 can also be implemented using a variety of separate or discrete chips (including, but not limited to: CPU 50 chips, RAM chips 52, boot ROM 54, display memory 56, disk controller 58, parallel/serial port controllers 60, USB controller 62, bus controllers 64, cache memory, memory controllers, interface controllers, EIDE device control, timing chips, and the like) mounted on one or more circuit boards in a manner well known to those of ordinary skill in the art.

The computer system 34 may be housed on a printed circuit board assembly designed around a "board on chip" technology, such as that produced, for example, by ZF Microsystems of Palo Alto, Calif. Alternatively, such printed circuit board assemblies can be any suitable commercial variety, such as, for example, the STRONGARM (SA-1110) boards manufactured by Intel Corporation of Santa Clara, Calif., the USB CARDPC Model C2I-P5-USB, RAZORBLADE System-On-A-Module Model C2I-RB7-400, or PLUG-N-RUN System-On-A-Module Model C2I-PR5-166, all built by Cell Computing of Santa Clara, Calif.

Whether implemented around a highly-integrated chip or chip-set, or implemented from a greater number of parts, the computer system 34 is preferably fixedly integrated into the diving mask or helmet 10 in a water-tight manner to protect the computer system from water during diving. Alternatively, the computer system 34 can be placed in a removable module that can be separated from the diving mask and reattached as needed.

The present invention includes a display system 66 that can be implemented in a variety of ways. For example, the display 68 of the present invention can be positioned inside or outside the lens 70, before either or both eyes, or level with, above or below the eye level.

In the illustrated embodiment of FIGS. 1-3, the display system 66 is an embedded prismatic projection system. The embedded prismatic projection system has a small prism-type optic 72 attached to or manufactured as part of the lens 70 of the face mask 10. An illuminated image source 74 is placed at the edge of the lens, and projects into the prism-type optic 72. The diver then views the information from the image source 74 superimposed onto the lens 70. This is similar to a "head-up" display system with respect to the image that the user views.

Figure 6:
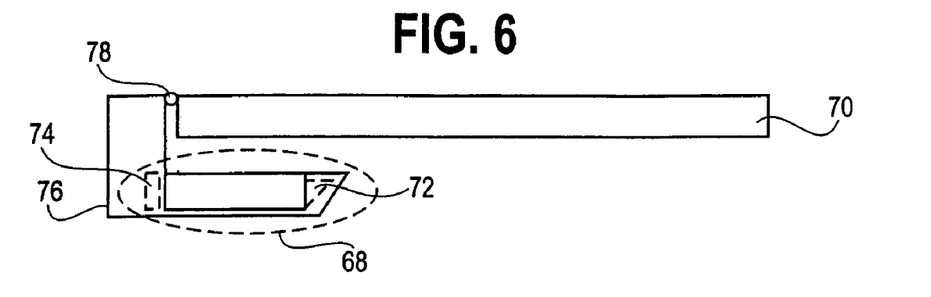
FIG. 6 is an elevational view of a prism-type optic that can be swung out of the way of the face plate of a face mask of the present invention.

In another specific embodiment, illustrated in FIG. 6, a prism-type optic 72 or prismatic projection system is provided as a modular assembly 76. The prismatic modular assembly has a prism-type optic 72 and an image source 74. As illustrated in FIG. 6, the prismatic modular assembly is mounted on a mechanical swivel 78 on the side of the diving mask 10, which permits the diver to remove the module from the field of vision when it is not required. However, the swivel 78 can be mounted on the top, bottom, or sides of the diving mask 10 as well. Prismatic projections systems developed by MicroOptical Corporation of Boston, Mass., for example, Model Nos. Model EG-7, CO-3 and CO-1 are suitable for use in the present invention.

Figure 7:
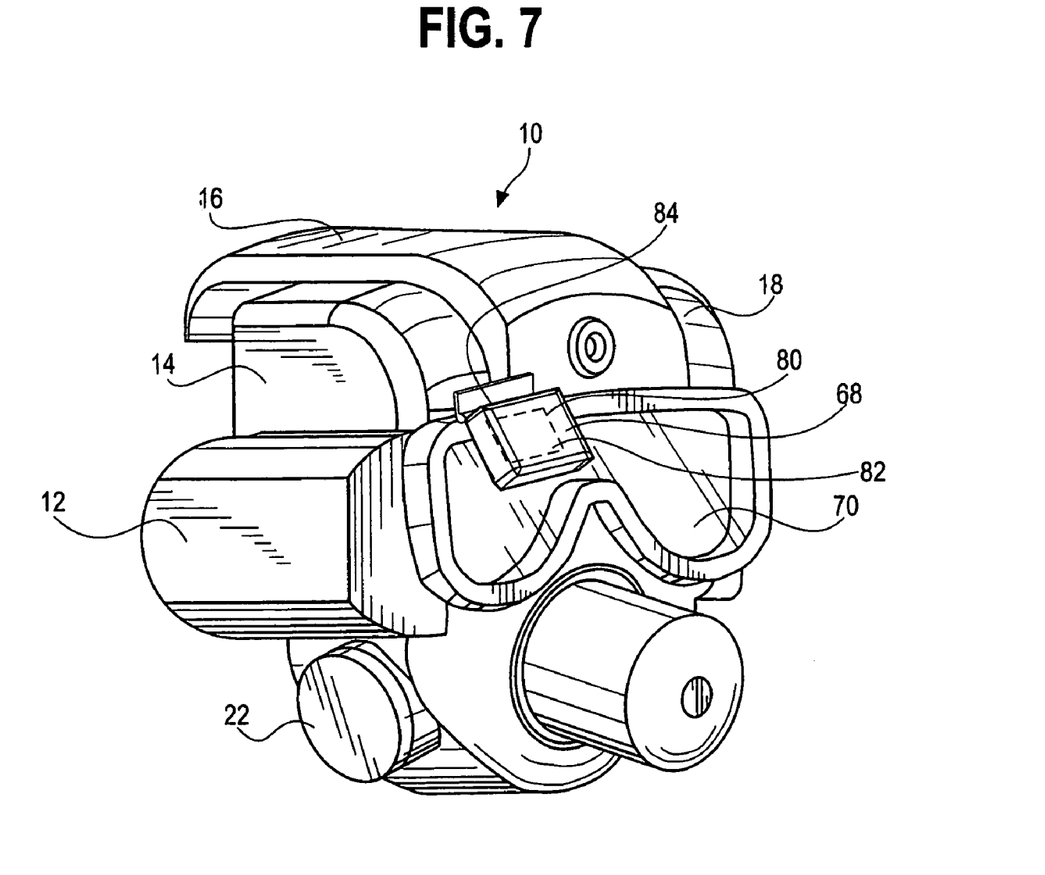
FIG. 7 is a prospective view of an alternate embodiment of the present invention incorporating a display screen.

In yet another embodiment, illustrated in FIG. 7, a display module 80 is attached to the outside of the mask. The module has a self-illuminating image source 82. Suitable self-illuminating images sources include, but are not limited to, cathode ray tubes (CRT), gas plasma displays, electro-fluorescence display, LED displays, and liquid crystal displays (LCDs).

As illustrated, the external display module 80 can be hinged on a snap-type hinge 84 that is movable into and out of view as desired by the diver. Optionally, the display module 80 may be affixed to the dominant eye side of the diving mask 10. The self-illuminating image source 82 may further include a power source, such as a battery.

Figure 8:
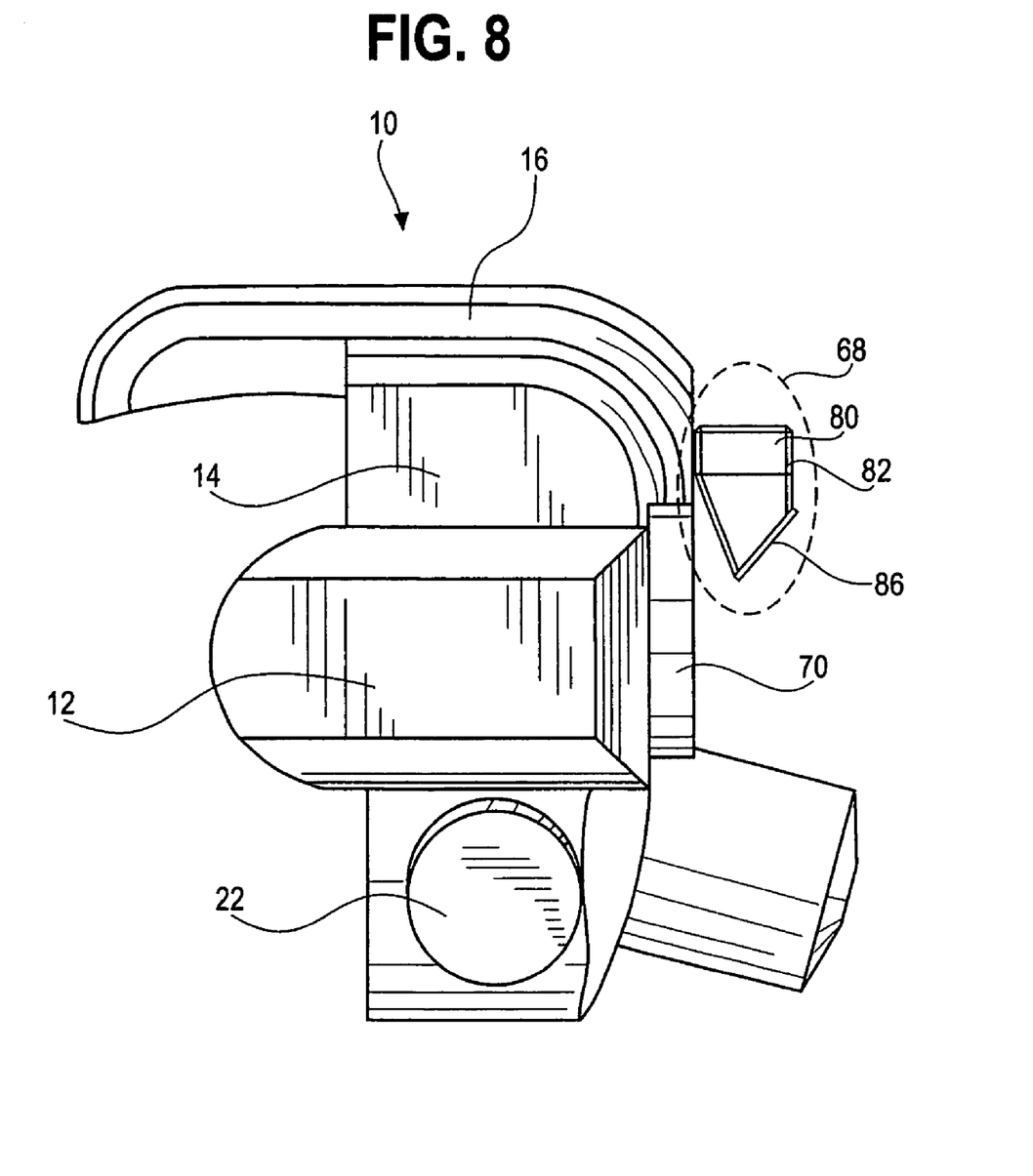
FIG. 8 is a side view of an alternate embodiment of the present invention using a half-silvered mirror in conjunction with a display screen.

As illustrated in FIG. 8, the self-illuminating display module 80 can be mounted on the top of the diving mask 10 and may use a "Murty" style beam splitter configuration so that the diver views the image by glancing up at a half-silvered mirror 86 that slightly overhangs the mask. The image source 82, such as a cathode ray tube, gas plasma display or liquid crystal display is positioned out of the field of view of the diver. The half-silvered mirror 86 depends downwardly from the image source and is positioned in the field of view of the diver. Optionally, the half-silvered mirror 86 may be positioned in front of and above a selected dominant eye of the diver. The result is that the image is superimposed over the diver's view of the external environment.

In yet another alternate embodiment, a sealed display (not shown) may be connected partially inside the mask. The mask is constructed to space the front of the mask from the head or face of the diver, such as is common with helmets. A hole may be either pre-formed or drilled in the mask lens to receive a sealed display cylinder (not shown). A prism is positioned at the end of the cylinder near the eye of the diver. The sealed display includes a monitor, which serves as an image source. A relay lens is positioned to focus the image from the monitor onto the prism, which redirects the image from the monitor to be viewed by the diver. The entire assembly is pressure sealed.

Referring back to FIG. 4, the display controller 32 operably connects the visual display device (or display) 68 to the computer system 34. As will be understood by those of ordinary skill, selection of the display controller 32 depends on the type of display 68 used. In the prism-type optical display devices discussed earlier, MicroOptics Corporation of Boston, Mass. provides suitable display controllers that accept VGA input, such as the Model EG-7, CO-3 and CO-1. When using such prism-type optic displays, the general purpose computer 34 may be provided with a chipset (RAMDAC, video controller, display memory, boot ROM and bus interface) for implementing VGA output, such that the VGA output from the general purpose computer 34 is used as input for the prism-type optical display controller 32.

In such an embodiment, the prism-type optical display controller 32 is housed and sealed within a specially formed compartment within the diving mask 10, such as in the second compartment 14 illustrated in FIGS. 1-3. Depending on the display technology selected, a sealed water proof cable may be used to connect to the display 68 with the computer system 34. The display 68 is operatively coupled to the computer system 34 by a short length of cable 88. Accordingly, no cable or wire extends from the diving mask in a region defined by the diver's head, to a part of the diver located away from the diver's head, such as the torso, arms, or legs. This reduces or eliminates the possibility of snagging the cable. Alternatively, the cable 88 may be routed through a channel that is molded into the diving mask itself 34. Preferably, the compartment housing the display controller 32 within the mask is located adjacent to the display 68 to permit the cable or wire connection to the display 68 to be an integral part of the mask 34, rather than a separate external cable. Accordingly, the computer system 34 may be operatively coupled to the display 68 such that no wiring, cable, or tether extending to the diving mask 10 is required. In the specific embodiments illustrated in FIGS. 1-3 and 5-7, the display controller 32 is located in the second compartment 14, adjacent to the upper right side of the diver's head. As will be appreciated by those of ordinary skill, if the display 68 is placed on the left hand side, the display controller 32 would preferably also be located on the left hand side, for example, in the fourth compartment 18.

With respect to a specific example or a suitable display 68, LCD displays can be controlled via a number of different display controller chips depending on whether a character-based or graphical display is desired. For example, the Hitachi Model 44780 controller may be used with character-based displays while the Toshiba Model T6963C controller may be used with graphical displays. It will be apparent to those of ordinary skill that integrating such chips with a general purpose computer 34 is a straightforward task, which will not be detailed here. Generally, LCD displays draw power directly from the same power source 90 as the general purpose computer 34. However, the present invention also contemplates displays 68 that draw power from power supplies independent from those of the general purpose computer 34. Such independent power source, such as batteries, may be housed in a separate compartment.

Referring back to FIG. 4, a sound transducer 92 provides an electrical output signal to the voice command system 26. Preferably, a microphone 92 installed within the speaking chamber 94 of the full face mask 10 provides the electrical output signal to the voice command system 26. One example of a suitable microphone and speaking chamber combination is DIVELINK available from Stone Electronics Ltd. of Victoria B.C., Canada and sold as part numbers COMFFR2000-120 (for the OCEAN FREE full face mask) or COMFFA2000-120 (For INTERSPIRO full face masks). Embodiments of the present invention utilizing full diving helmets or the equivalent can have a dedicated microphone located within the helmet. As an alternative to the microphone 92, the transducer from an artificial larynx can be applied to the throat of a diver. Any suitable sound or vibration transducer may be used. For example, crystal microphones, piezoelectric transducers, and vibration transducers may be used. The sound transducer 92 is preferably located in the speaking chamber 94, but need not be specifically housed internal thereto. Any suitable location will suffice as long as the sound transducer 92 can receive the voice signals. The voice command system 26 may be the primary user input control device to the general purpose computer 34, which is housed in the mask 10. The voice command system 26, preferably located in the first compartment 12, accepts the spoken commands of the diver and produces digital signals, which are accepted by the general purpose computer 34. A speech recognition portion can be included in the voice command system 34 to recognize and identify the electrical signals as spoken words. While the computer 34 and interface to the computer may simultaneously allow connectivity for other user input devices, the voice recognition system eliminates the need for other diver input devices, such as a keyboard, mouse pointer, and the like, and permits implementation a fully self-contained and streamlined submersible computing system. In this embodiment, the attention of the diver is not diverted, as the diver can focus full attention to the underwater tasks without directing his attention to operation or control of external input devices.

In FIG. 4, one specific embodiment includes a voice activation circuit 96 and a voice recognition system (voice command system) 26. The voice activation circuit 96 can control whether the general purpose computer 34 is active (fully powered) or in sleep mode (reduced or no power). The voice activation circuit 96 may be a "transitional activator" that brings the computer 34 and peripheral devices from a low-power "sleep" mode to full power. This function may be performed by the voice activation circuit 96 by continuously polling or by use of a pre-determined key word or sound. However, embodiments that rely on the computer 34 for continuous health and safety monitoring do not utilize the power-down embodiment.

In another specific embodiment, the speech recognition system 26 and voice activation circuit 96 are included in a speech recognition processor such as the RSC-300/364 devices produced by Sensory Inc. of Palo Alto, Calif. Preferably, the RSC-300 is used. The RSC-300 can be programmed to operate in a low power continuous listening mode until a particular digital pattern (digitized sound) is received from the sound transducer 92. One advantage of the RSC-300/364 devices is that they have automatic gain control to compensate for input that may not be optimal due to the position of the microphone. Another advantage of the RSC-300/364 devices is lower power consumption, drawing only about 10 mA at 3V. The speech recognition system 26 can reside on a computer board in the first compartment 12 or may be located at another location between the sound transducer 92 and the general purpose computer 34.

The speech recognition system 26 is operatively coupled to the microphone or sound transducer 92 and receives the electrical signals from the sound transducer 92. The speech recognition system 26 is also operatively coupled to the computer system 34 and is configured to recognize and identify the electrical signals as the spoken words from the diver. The spoken words or input is provided to the computer system 34, which performs various functions depending upon the spoken words.

In another embodiment, the speech recognition system 26 includes an amplifier and analog-to-digital conversion devices. Analog-to-digital converters accept input from the microphone 92 and provide suitable digital signals to the general purpose computer 34. For example, a "sound card" for a personal computer, such as the Hercules Game Theatre XP Sound Card Model by Guillemot Corp. may be used. In such implementations, the general purpose computer 34 is provided with software to process the voice signals to recognize the command given. Such software may be, for example, Dragon Naturally Speaking Professional voice recognition software by Dragon Systems, Inc. or VIVE VOICE by IBM Computer.

In this embodiment, the computer system 34 includes a speech recognition portion, which first receives the electrical signals from the sound transducer 92. The electrical signals are converted into digital signals. The speech recognition portion then processes the digital signals so as to recognize and identify the digital signals as the spoken words from the diver. Input is provided to the computer system corresponding to the spoken words so that various actions may be taken.

In general, whether the voice recognition function is provided within the computer system 34 or by a separate voice recognition processor, the end result is the same. When a spoken word is processed, the computer 34 receives input corresponding to that word, which may be a numeric code or ACCII string. For example, if the diver speaks the word "FILE," the computer 34 may display a pull-down menu called "FILE," which may be similar to the FILE menu present in many the Microsoft WINDOWS applications. In summary, the diver, through spoken words and voice recognition, can control the operation of the computer system without using external input devices.

In one embodiment, electrical power for the computer system 34 is provided by a power source 90 located in the diving mask 10, preferably in a battery pack located above the eye portion of the mask in the third compartment 16. In an alternate embodiment, power for the computer system 34 is provided by a power supply external to the mask. In this specific embodiment, the power cable is tethered to a diving harness on the diver's shoulder to reduce the risk of the power cable snagging or otherwise encumbering the diver.

A wide variety of suitable power sources 34 exist for powering the electrical components of the present invention. Various types of batteries may be used as power sources 34, such as nickel-cadmium batteries, lithium ion batteries, and lithium polymer batteries. When available in production quantities, moldable lithium polymer batteries may be used, which can be molded into various shapes for suitable incorporation into the diving mask. Preferably, the batteries are vented using a check valve or other suitable venting mechanism to allow the safe venting of gasses that may be generated, as is known to those of ordinary skill in the art.

Referring to FIG. 4, the present invention may also include a dive monitoring sensor system 98 embedded within the mask 10 or contained within a sealable compartment. The dive monitoring sensor system 98 includes clock circuitry and memory, which is dedicated to the recording of pressure measurements as a function of time. Further electronics can be linked to the sensors 98 to provide data conventionally provided by traditional dive computers. The dive monitoring sensor system 98 is operatively connected to the computer 34 and provides the computer 34 with sensor data for recording and/or display. Application software in the computer 34 can be configured to record and display data such as depth, dive time, bottom time, decompression limits and tissue nitrogen loading, as is known by one skilled in the art. As shown in FIG. 4, integration of the items above with a low pressure hose connection device 100 from the diver's air supply allows the inclusion of an air gauge display. This integration obviates the need for other types of life support systems or monitoring instrumentation. The reduction of systems and/or instrumentation further streamlines the profile of the diver in the water and minimize distractions from tasks at hand.

Additionally, as shown in FIGS. 1-3, a digital camera 102 can be attached to or molded into the body of the dive mask 10 or full face mask. A digital camera system housing 104 is incorporated above the lens of the mask 10 anterior to the third compartment 16. The compartments and digital camera system 102 can be formed as a continuous shell that is attached securely to the periphery of the face mask 10. As illustrated in FIG. 4, the digital camera 102 can be attached to the computer system 34 through appropriate interface electronics, as is known in the art. For example, the ZFX86 processor includes a USB bus allowing USB digital cameras to be installed with minimal effort. A suitable camera module, for example, the C3188 module plus OV511 USB controller, may be used in the present invention, which are available from Quasar Electronics Limited of the United Kingdom. Application software resident in the computer system 34 permits the diver to control the digital camera 102 electronically in a hands-free way via the voice commands. For example, the diver can use the display 68 as a view finder to see the current field of view "seen" by the camera 102. Accordingly, the image that the camera 102 "sees" is presented to the diver by the display device 68. Further, the software can be programmed to allow the diver to adjust the field of focus of the camera 102 in the mask-mounted display 68, or may be directed to capture of a single frame or a stream of video pictures with specific commands. The use of the computer 34 also allows storage of pictures within the non-volatile memory 38 of the computer 34 (such as memory sticks, flash cards, and the like) dedicated solely to the digital camera.

The mask 10 can also have an underwater earphone device 48. Earphones for use underwater are typically bone conduction-type earphones. Such earphones are desirable because the diver's outer ear is normally filled with water when diving, which greatly reduces the diver's ability to hear. However, sound signals can be transmitted to the diver by mechanical vibration via the bone around the ear. The sound is then transmitted to the inner ear. While the proper location for the earphone varies somewhat from diver to diver, it will generally be on a bony protrusion of the skull, as is known to one skilled in the art. A speaker may be provided in the helmet-type mask.

In a further embodiment illustrated in FIG. 4, the mask may include a transceiver system 108 having a receiver 110 (or reception system) for receiving incoming transmissions, and a transmitter 112 (or transmission system) for sending outgoing transmissions. Incoming transmissions can either be voice or can be digitally encoded and/or encrypted voice/data transmissions. Data such as speech, numeric data, and graphical data may be transmitted or received. Such data may be analog or digital in nature. Any suitable type of transmission medium may be used, such as, for example, short haul RF, ultrasonic, laser or other means. Transceivers 108 suitable for use with the present invention include The BUDDY PHONE line, Model OR-BUD/S, and Ocean Reef USA, Model GSM, Code 33105, by Ocean Technology Systems and DIVELINK Communicator, COM-U01 by Stone Electronics of Victoria, Canada. The receiver 110 can include a tuner, amplifier, gain control system, and the like, which enables the receiver to select a desired incoming transmission.

Referring to FIG. 4, the voice/data receiver 28 also includes a modem for incoming signals that accept the incoming signal from the receiver 110. The voice/data transmitter can also include a modem for outgoing signals to be routed to the transmitter 112. A signal splitter can split the incoming signal so that the signal (if speech) can be heard by the diver via the earphone 48 and can also be processed by the modem, which provides the data to the computer. The design and construction of signal splitters and modems is well known, and any number of commercially available implementations can be used in the present invention. Similarly, the transmitter can receive input from either the computer 34 or the sound transducer 92 so that the transmitter 112 can be used by the computer 34 to transmit data or commands to the diver or to transmit voice messages.

Incoming digital transmissions directed to the computer 34 can be decoded and/or decrypted by software residing on the computer 34. Alternatively, the received digital transmissions can be decoded and/or decrypted by dedicated hardware such as the data encoder/decoder 36 illustrated in FIG. 4. The computer 34 can then process the decoded and/or decrypted digital information with software and act accordingly, such as by displaying the received data on the display.

In another embodiment, illustrated in FIG. 4, a peripheral device control system 24 is included. The peripheral device control system 24 permits the computer 34 to function as a controlling device for other peripheral devices that may be attached to the diver's body and the computer. Such peripheral devices include various data acquisition devices, scientific instruments, weapons systems, and the like, and can be directed by the diver via means of voice commands as described above. Appropriate underwater interfaces and waterproof cabling can be provided to route the appropriate inputs to the computer. For example, the ZFX86 chip described above is capable of controlling a wide variety of devices including, but not limited to, parallel port devices, serial port devices, USB port devices. Optionally, a BLUETOOTH interface can be provided for the computer for use with short range wireless BLUETOOTH devices as peripherals for the general purpose computer. Further, the diving mask 10 can be provided with electronics for detecting underwater homing devices and providing range and direction information to the computer.

The system can also include a tactile diver input system 30. A tactile diver input system 30 can be as simple as a switch or button, or can be more complex, such as the Chordic input interface available from WetPC of Australia.

Referring to FIG. 4, the system of the present invention may also includes a gyroscopic/inertial sensor input system 40. The gyroscopic/inertial sensor 40 is operatively connected to the computer 34, preferably via the USB bus, and acts as a pointing device. A suitable gyroscopic/inertial sensor 40 is the Microgyro 100 is manufactured by Gyrations Corporation of Saratoga, Calif. An alternative inertial sensor that operates in three planes is the INTERTRAX2 available from Intersense of Burlington, Mass.

As described above, the diver can input commands to the computer 34 in a hands-free manner by speaking into the sound transducer 92. The sound transducer 92 translates the diver's speech into electrical signals and passes those signals to the voice command portion 26 or voice recognition processor. The voice command portion 26 then recognizes and identifies the spoken sound or word. The recognized word is then passed to the computer system 34 to be associated with a command or a selected function shown on the display device 68.

In one embodiment, the computer 34 is programmed to accept commands via a series of hierarchical menus. For example, the highest level of menu may contain a list of the subsystems controlled by the computer 34, such as:

1) LIFE SUPPORT SYSTEMS
2) EXTERNAL PERIPHERAL DEVICES
3) CAMERA
4) GYROSCOPIC/INERTIAL SENSOR INPUT
5) RECEIVER
6) TRANSMITTER
7) POWER MANAGEMENT
8) COMPUTER PROGRAM APPLICATIONS

Thus the diver could select life support system monitoring 46 by saying the word "one" or check the power level of his battery by saying the word "seven."

The use of a numbered list is exemplary. A wide variety of methods of displaying menus are known in the art, and are contemplated by the present invention. Alternative mechanisms may include selection by letter index (A, B, C), key word index (LIFE, EXTERNAL, CAMERA, GYRO, RECEIVER, TRANSMITTER, POWER), or by highlighting the current selection and having the diver manage selection by selecting the "next" or "previous" selection. For example, in the menu above, if "LIFE SUPPORT SYSTEM" above was highlighted, by saying "next, next, select" the diver would select the DIGITAL CAMERA SYSTEM menu or application.

As illustrated, the computer system 34 may provide a plurality of predetermined functions or applications, which are displayed on the display device 68. The computer system 34 is configured to perform at least one of the predetermined functions in response to the input representative of the spoken words of the diver. Each function shown and selected may represent a self-contained task, which can be directly performed by the computer system 34, or may cause one or more additional menus or sub-menus to be displayed. Each sub-menu may contain additional predetermined functions or additional sub-menus. Accordingly, the menus may be hierarchical sets of menus.

In an alternate embodiment, a vocabulary is developed for control of the computer 34. A vocabulary can include of a plurality of recognition sets. Each recognition set includes one or more words. As will be apparent to those of ordinary skill in the art, a recognition set having fewer words provides better performance in a speaker-independent environment. Further, it will be apparent to those of ordinary skill that it is easier to distinguish among a small set of words than a large set of words. Preferably, when using the RSC-300 speech recognition processor or system 26, each recognition set has no more than fifteen words. Typically, the speech processor 26 will have only one recognition set active at a time. The speech processor 26 monitors the electrical signals generated by the sound transducer 92 to recognize patterns corresponding to words in the limited vocabulary. When the speech processor 26 recognizes a word, it transmits a corresponding word signal to the computer system 34.

The computer 34 may include various resident application programs, which may correspond to the menu selection described above. Further, the display of the various menus may be a "high-level" application program, and various recognition sets may be associated therewith. The recognition set may change depending upon the application selected. The computer 34 may respond to a word signal by changing the recognition set. For example, when the computer 34 recognizes the spoken word "camera," as shown as selection number three of the eight selections previously described, it programs the speech recognition processor 26 with a recognition set appropriate to the camera control program. The next spoken word may then represent a specific command to be executed, at which point the computer 34 would execute the appropriate command. Thus, in the "camera" speech recognition set, the word "snap" might trigger the taking of a picture. The following are examples of various applications and menu selection, and are exemplary in nature and are not intended to limit the scope of the present invention.

EXAMPLE 1

Photography

Figure 9:
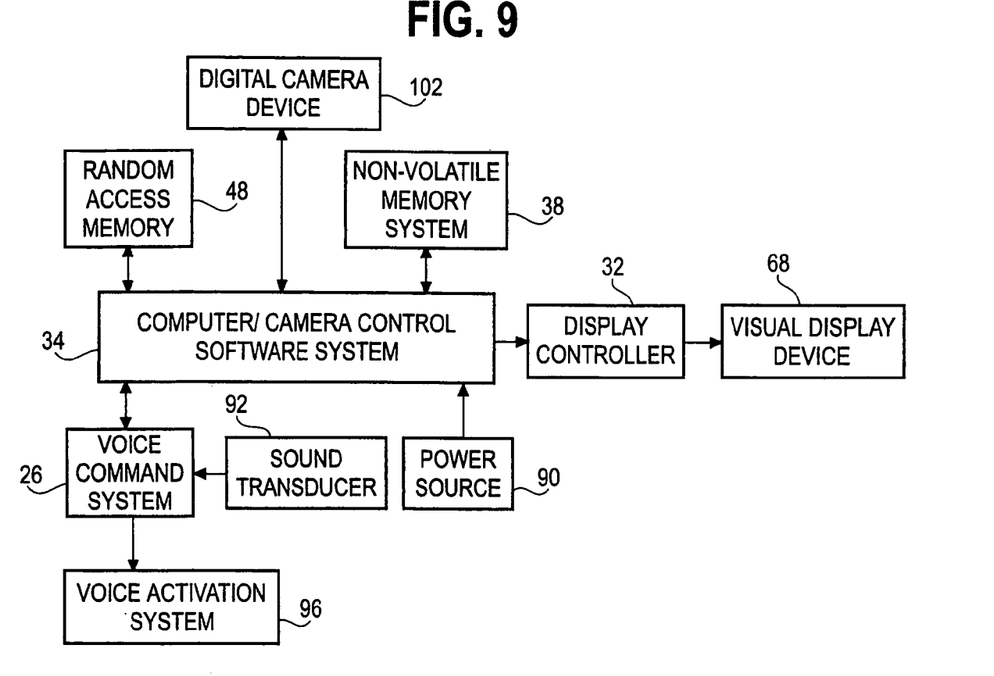
FIG. 9 is a block diagram.

Referring to FIG. 9, a diving mask 10 for underwater photographic work is constructed with the computer 34, voice command system 26, sound transducer 92, digital camera 102, display controller 32 and display 68. When the DIGITAL CAMERA option is selected from the main menu illustrated above, a sub-menu for controlling the digital camera 102 displays the following sub-menu:
1) RETURN TO MAIN MENU
2) DISPLAY CURRENT CAMERA VIEW
3) ZOOM FIELD-OF-VIEW OUT
4) ZOOM FIELD-OF-VIEW IN
5) SINGLE SHOT
6) BEGIN VIDEO STREAM
7) END VIDEO STREAM The menu items are selected by the diver by speaking the number of the menu selection. For example, the diver can then easily command the taking of photographs as needed while keeping his hands free to move a lot or operate equipment.

EXAMPLE 2

Portable Instruction Manual

Figure 10:
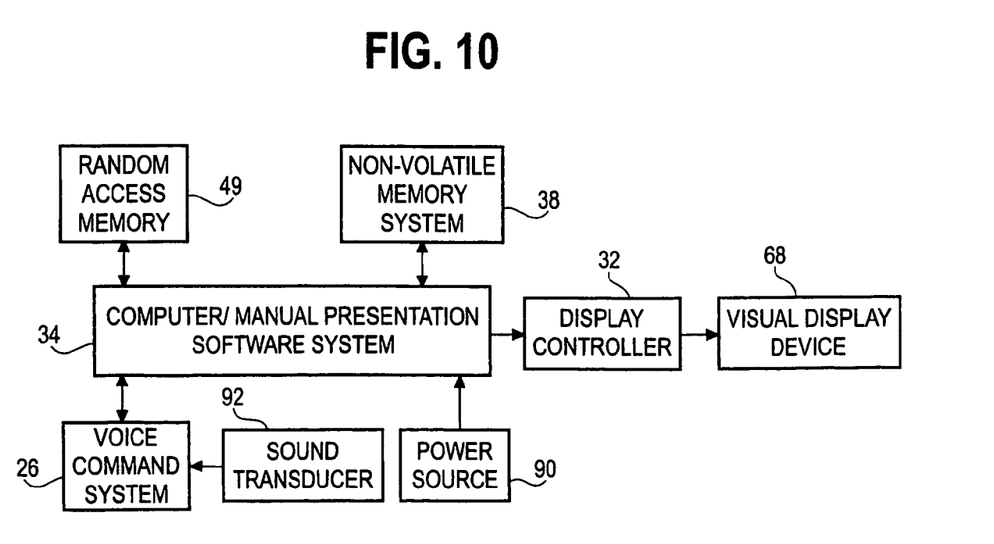
FIG. 10 is a block diagram.

Referring to FIG. 10, the computer 34 can be programmed to provide an instruction manual for a task to be performed. For example, the diver may "call up" an instruction manual showing the details of how to repair an underwater cable or pipe. Alternatively, the instruction manual may be in the form of a series of instructional elements or a checklist. The computer 34 may be programmed to move forward or backward among the instructional elements when the speech processor indicates to the computer that the diver has said "next" or "previous." The diver can thereby navigate a checklist by saying "next" or "previous."

EXAMPLE 3

Data Collection

Figure 11:
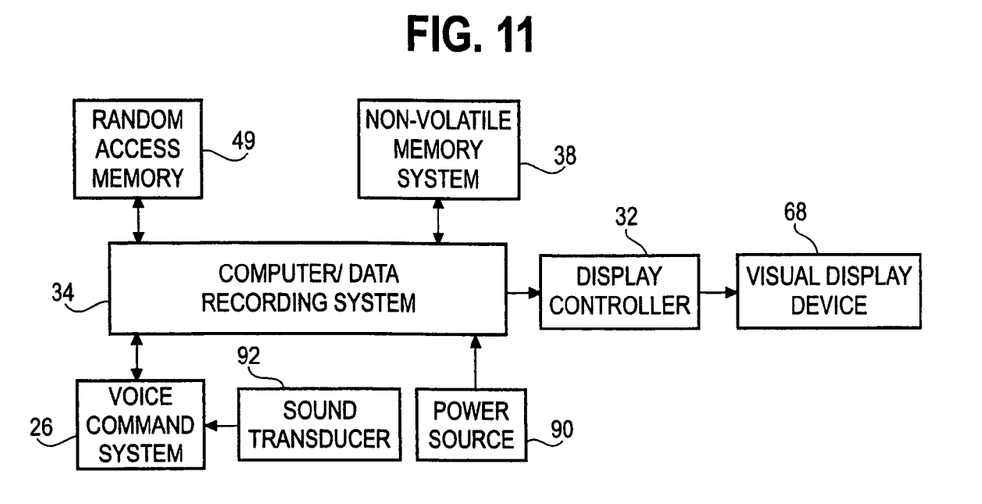
FIG. 11 is a block diagram.

Referring to FIG. 11, the computer 34 can be programmed to present the diver with options for data entry. For example, the computer 34 may implement software such as Dragon Naturally Speaking or Viva Voice software described above to transcribe input spoken by the diver. Alternatively, the computer 34 can simply record digitized signals received from the voice command system 26 as data in the non-volatile memory 38. Further, the computer 34 can be programmed with application-specific software that prompts the diver for data entry of a specific kind. For example, if the diver is cataloging undersea plants and animals, the computer can timestamp hierarchical menus that enable the diver to enter data regarding the discovery for storage by the computer 34. The computer 34 can automatically time-stamp the entries to relieve the diver of one kind of mundane aspect of data collection.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A user programmable personal computer for use underwater by an underwater diver, for the input and processing of data related to underwater activities, comprising:
a computer processor coupled to one or more data storage devices, volatile and non-volatile memory devices, one or more data input device, a voice actuation device and a display device;
a housing capable of withstanding dive pressures while protecting the computer from the ambient environment; and
a dive helmet adapted to secure the personal computer to a diver such that the display device is readily visible to the diver, whereby the diver, while under water, utilizes the one or more data input devices or voice actuation device to input data, store data in the data storage device and process the data so as to cause the computer to function providing a display of such functions visibly to the diver.

2. The user programmable personal computer of claim 1 wherein the personal computer is operatively coupled to the display device such that no wiring or tether external to the dive helmet.

3. The user programmable personal computer of claim 1 wherein the display device is operatively coupled to the computer system by short length of cabling so that no external cabling extends from the dive helmet in a region defined by the diver's head portion to a part of the diver located away from the diver's head.

4. The user programmable personal computer of claim 1 wherein the voice actuation device includes a sound transducer that is selected from the group consisting of a microphone, crystal microphone, piezoelectric transducer, throat/larynx transducer and vibration transducer;
the computer-processor is selected from the group consisting of a computer, microprocessor, RISC processor, single-chip computer, single-board computer, controller, micro-controller and discrete logic computer; and
the display device is selected from the group consisting of a liquid crystal display, LED display, electro-fluorescence display, gas plasma display, prism-type optic display, prismatic projection system and cathode ray tube.

5. The user programmable personal computer of claim 1 wherein the non-volatile storage is selected from the group consisting of a ROM, PROM, EPROM, flash memory, optical memory, static memory, bubble memory, memory sticks and hard disk memory.

6. The user programmable personal computer of claim 1 wherein the personal computer system further includes a speech recognition portion configured to receive and process the electrical signals from the voice actuation device, and recognize and identify the electrical signals as the spoken words from the diver, and to provide input to the personal computer corresponding to the spoken words.

7. The user programmable personal computer of claim 1 further including a speech recognition processor operatively coupled to the voice actuation device to receive the electrical signals therefrom, the speech recognition processor configured to recognize and identify the electrical signals as the spoken words from the diver and to provide input to the personal computer corresponding to the spoken words.

8. The user programmable personal computer of claim 1 wherein the personal computer provides a plurality of predetermined functions displayed on the display device, the personal computer performing at least one of the predetermined functions in response to the input representative of the spoken words of the diver.

9. The user programmable personal computer of claim 8 wherein the predetermined functions are selected from the group consisting of a menu, pull-down menus, digital camera control applications, life support applications, general purpose applications, gyroscopic/inertial sensor applications, transmitter and receiver applications and power management applications.

10. The user programmable personal computer of claim 9 further including a gyroscopic/inertial sensor operatively coupled to the personal computer.

11. The user programmable personal computer of claim 1 wherein the personal computer provides one or more menus to the display device, each menu containing one or more predetermined functions executable by the personal computer.

12. The user programmable personal computer of claim 11 wherein the plurality of menus include a hierarchical set of menus.

13. The user programmable personal computer of claim 1 further including
   a receiver system operatively coupled to the personal computer and configured to receive incoming data from the underwater diving environment;
   a transmitter system operatively coupled to the personal computer and configured to transmit data to the underwater diving environment; and
   the receiver system and transmitter system located proximal the dive helmet and being sealingly isolated from the underwater diving environment.

14. The user programmable personal computer of claim 13 wherein the data is selected from the group consisting of speech data, digital data, numerical data and graphical data.

15. A user programmable personal computer for use underwater by an underwater diver, for the input and processing of data related to underwater activities, comprising:
   a computer processor coupled to one or more data storage devices, volatile and non-volatile memory devices, one or more data input device, a voice actuation device and a display device;
   the display device having a viewing portion, defined by the diver's face and a lens, for providing visual images to the diver including providing computer output screens;
   a water-tight speaking chamber configured to sealingly engage a portion of the diver's face including the diver's mouth to permit the diver to speak while underwater so as to provide voice commands to the personal computer while underwater;
   a sound transducer located proximal the speaking chamber;
   the sound transducer and display device configured to provide the diver with a fully functional computer;
   the personal computer, the viewing portion and the speaking chamber sealingly isolated from the underwater diving environment; and
   voice recognition means for recognizing and identifying spoken words of the diver wherein the identified spoken words provided to the personal computer direct the functions of the personal computer system to process data and to provide visual images to the display device in response thereto to facilitate hands-free computer and other operations of the diver.

16. The user programmable personal computer of claim 15 wherein the voice recognition means is operatively associated with the personal computer and is configured to receive electrical signals from the sound transducer, the voice recognition means being configured to recognize and identify the electrical signals as spoken words from the diver and to thereby provide input to the personal computer corresponding to the spoken words.

17. The user programmable personal computer of claim 15 wherein the voice recognition means further includes a voice recognition processor operatively coupled to the personal computer and coupled to the sound transducer to receive electrical signals therefrom, the speech recognition processor configured to recognize and identify the electrical signals as the spoken words of the diver and to thereby provide input to the computer system corresponding to the spoken words.

18. A method of using a personal computer underwater by an underwater diver, for the input and processing of data related to underwater activities, comprising the steps of:
   providing the diver with a diving mask having a viewing portion defined by the diver's face and a lens;
   placing a visual display device proximate the viewing portion to provide visual images, including computer output screens, to the diver;
   incorporating a sound transducer within a water-tight speaking chamber, the speaking chamber configured to sealingly engage a portion of the diver's face including the diver's mouth to permit the diver to speak while underwater;
   operatively coupling a personal computer system, comprising a computer processor coupled to one or more data storage devices, volatile and non-volatile memory devices, one or more and data input device with the sound transducer and the visual display device;
   sealingly isolating the computer system, the viewing portion, and the speaking chamber from the underwater diving environment;
   speaking while underwater into the sound transducer located proximal the speaking chamber to produce electrical voice command instructions for the personal computer;
   receiving and processing the electrical voice command instructions in the personal computer system, the personal computer configured to recognizing and identifying the electrical signals as spoken words of the diver, the identified spoken words providing input to the personal computer; and
   directing the personal computer to provide visual images to the visual display in response to the identified spoken words and the processing of data to facilitate hands-free operation of the diver.

* * * * *